United States Patent [19]

Shirao et al.

[11] Patent Number: 5,107,210
[45] Date of Patent: Apr. 21, 1992

[54] DISPLACEMENT SENSING CIRCUIT WITH COIL AND BAND PASS FILTER FOR ATTENUATING EXTERNAL INTERFERENCE

[75] Inventors: Yuji Shirao, Kanagawa; Hiroyuki Chino; Toshiharu Nakazawa, both of Tokyo, all of Japan

[73] Assignee: Ebara Corporation, Tokyo, Japan

[21] Appl. No.: 633,842

[22] Filed: Dec. 26, 1990

[30] Foreign Application Priority Data

Dec. 29, 1989 [JP] Japan .................. 1-342771

[51] Int. Cl.$^5$ .................................. G01B 7/14
[52] U.S. Cl. ..................... 324/207.12; 324/207.16; 324/207.25; 324/207.26; 328/167
[58] Field of Search .............. 324/160, 163, 166, 173, 324/174, 207.12, 207.16, 207.19, 207.25, 207.26, 225; 328/167

[56] References Cited

U.S. PATENT DOCUMENTS

| 3,488,581 | 1/1970 | Foster ............... 324/166 X |
| 3,715,659 | 2/1973 | Abnett et al. ........... 324/225 X |
| 4,321,602 | 3/1982 | Kipp ................ 328/167 X |
| 4,654,589 | 3/1987 | Whetham et al. ...... 324/207.26 X |
| 4,678,992 | 7/1987 | Hametta ............ 324/207.25 |
| 4,856,098 | 8/1989 | Morra .............. 324/207.16 |

FOREIGN PATENT DOCUMENTS

| 1107953 | 5/1961 | Fed. Rep. of Germany . |
| 0186102 | 11/1982 | Japan ............... 324/207.12 |
| 62-173005 | 11/1987 | Japan . |
| 1-318901 | 12/1989 | Japan . |

Primary Examiner—Gerard R. Strecker
Attorney, Agent, or Firm—Armstrong, Nikaido, Marmelstein, Kubovcik and Murray

[57] ABSTRACT

A displacement sensing circuit for sensing a displacement of a measured object without any contact with the measured object. A detecting coil is disposed relative to the measured object to be capable of changing its inductance in response to a displacement of the measured object from a predetermined position. An output signal from the detecting coil is passed through a band-pass filter. The filter has a frequency band width which is equal to at least twice the upper limit of a response frequency of the sensing circuit, thereby outputting a signal less influenced by a noise. An output from the band-pass filter is detected to provide a signal corresponding to the displacement of the measured object.

6 Claims, 4 Drawing Sheets

DISPLACEMENT SENSING CIRCUIT WITH COIL AND BAND PASS FILTER FOR ATTENUATING EXTERNAL INTERFERENCE

BACKGROUND OF THE INVENTION

1. Field of the Invention

The present invention relates to a displacement sensing circuit for sensing a displacement of a measured magnetic object by sensing a change in inductance of detecting coils, and being capable of sensing such a displacement without being influenced by external noises caused by interference signals even though these noises are picked up by the detecting coils and the wires interconnecting the coils and electric circuits.

2. Prior Art

FIG. 1 shows the construction of a displacement sensing system of the prior art. In this figure, a pair of displacement sensors A and B are disposed on an axis X passing the center of a rotor (a measured object) P made of magnetic material, and another pair of displacement sensors C and D are disposed on an axis Y perpendicular to the axis X and passing the center of the rotor P. Each of the displacement sensors comprises a magnetic core and a detecting coil wound around the magnetic core. Detecting coils A-1 and B-1 of the displacement sensors A and B, respectively, disposed on the axis X are connected in series and serve to detect a displacement of the rotor P along the axis X. Detecting coils C-1 and D-1 of the displacement sensors C and D, respectively, disposed on the axis Y are connected in series and serve to sense a recurring displacement of the rotor P along the axis Y. This detection utilizes such a characteristic that the inductance of the detecting coils changes due to the displacement of the rotor P from a predetermined position with respect to the detecting coils.

When such a displacement sensing system is used in a circumstance where interference noise arises, the detecting coils, electric circuits connected to the coils and the wires interconnecting them pick up such noise signals which are superimposed on the output signals of the detecting coils, that is, displacement signals amplitude-modulated by the displacement of the rotor P, which causes the displacement signals to be distorted by the noise and the accuracy in sensing the displacement of the rotor to deteriorate.

SUMMARY OF THE INVENTION

The present invention has been proposed in view of the above-described problems, and it is an object of the invention to provide a displacement sensing circuit capable of attenuating external interference signals, eliminating any influence of the external noises and accurately sensing a displacement of a measured object.

In order to achieve such an object of the invention, a displacement sensing circuit according to the present invention senses a displacement of a measured object without any contact with the measured object. A detecting coil is disposed relative to the measured object and changes its inductance in response to a displacement of the measured object from a predetermined position. The displacement sensing circuit comprises:

signal generating means for generating and supplying a carrier wave to the detecting coil;

band-pass filter means receiving an output from the detecting coil and having a frequency band width which is equal to at least twice the upper limit of a response frequency of the detecting coil; and detector means for detecting an output from the band-pass filter means and for generating a signal corresponding to the displacement of the measured object out of the detector means.

The carrier wave amplitude-modulated by the displacement of the measured object is output from the detecting coil.

An embodiment of the present invention includes a differential amplifier. The band-pass filter means includes a first band-pass filter inserted between the intermediate point of the series-connected detecting coils and a first input terminal of the differential amplifier, and a second band-pass filter inserted between the signal generating means and a second input terminal of the differential amplifier. The output of the differential amplifier is supplied to the detector means.

Another embodiment of the present invention also includes a differential amplifier, and the band-pass filter means includes a band-pass filter inserted between the differential amplifier and the detector means.

The detector means may be a synchronous detector receiving an output from the differential amplifier and a reference signal from the signal generating means.

According to the present invention, the signal output from the detecting coil is, before detected, passed through the band-pass filter means having a frequency band width which is at least twice the upper limit of a frequency range required for the sensors. Consequently, even if a noise signal having a frequency outside the pass-band of the band-pass filter means is picked up by the detecting coil, electric circuits connected thereto and wires interconnecting the coil and the circuits, the noise signal is fully attenuated to enable an accurate detection of a displacement of the measured object.

The above and other objects and advantages of the invention will become clearer from a consideration of the following description taken in connection with the accompanying drawings.

DETAILED DESCRIPTION OF THE PREFERRED EMBODIMENTS

Figure 2:
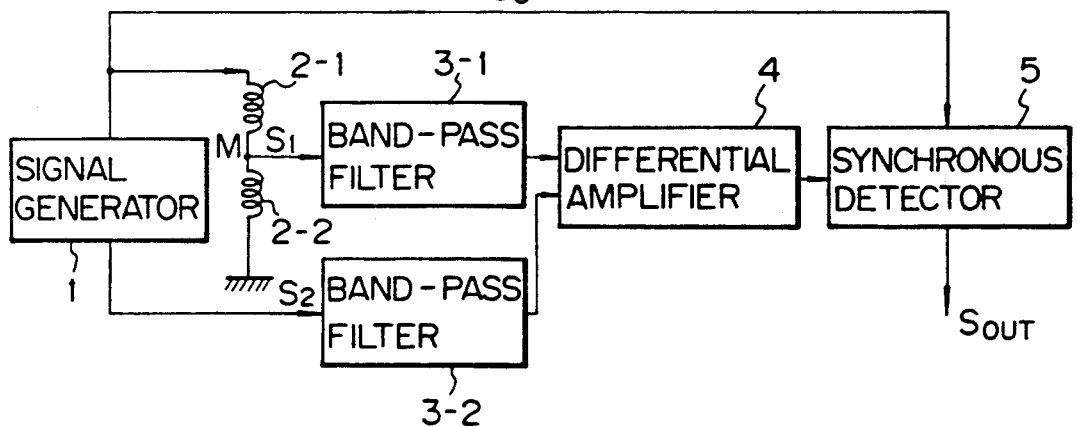
FIG. 2 is a block diagram schematically showing the construction of a displacement sensing circuit according to the present invention.

FIG. 2 shows a block diagram of an embodiment of a displacement sensing circuit according to the present invention. In the figure, a first output terminal of a signal generator 1 generating a carrier signal is connected to one end of a pair of detecting coils 2-1 and 2-2 connected in series. An intermediate point M between the detecting coils 2-1 and 2-2 is connected to a first band-pass filter 3-1 and a second output terminal of the signal generator 1 is connected to a second band-pass filter 3-2. The outputs of the first and second band-pass filters 3-1 and 3-2 are fed to first and second input terminals of a differential amplifier 4, respectively, and the output of the differential amplifier 4 is connected to a first input to a synchronous detector 5. A second input of the synchronous detector 5 is connected to the first output terminal of the signal generator 1.

Figure 1:
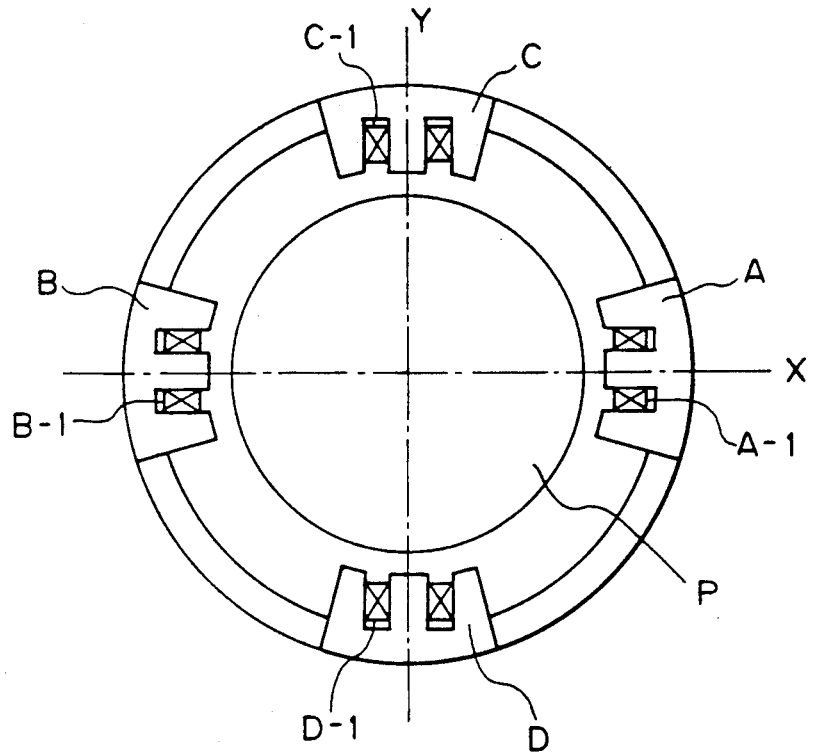
FIG. 1 schematically shows a known displacement sensing system.

Similar to the detecting coils shown in FIG. 1, the detecting coils 2-1 and 2-2 are wound around magnetic cores and disposed to face a magnetic measured object. Since the inductances of these detecting coils are changed by a displacement of the measured object, the electric potential of the connection point M between the detecting coils 2-1 and 2-2 changes as the measured object is displaced. A displacement signal S1 output from the point M and amplitude modulated by the displacement of the measured object passes through the band-pass filter 3-1 and is supplied to the first input terminal of the differential amplifier 4. A reference signal S2 from the second output terminal of the signal generator 1 passes through the second band-pass filter 3-2 and is supplied to the second input terminal of the differential amplifier 4.

The displacement signal S1 and the reference signal S2 are differentially amplified by the differential amplifier 4 and the output of the differential amplifier 4 is fed to the synchronous detector 5 which detects the output of the amplifier 4 synchronously with a synchronization signal S3 from the signal generator 1 to output a signal Sout indicating an amount of displacement taken place at the measured object.

Figure 3:
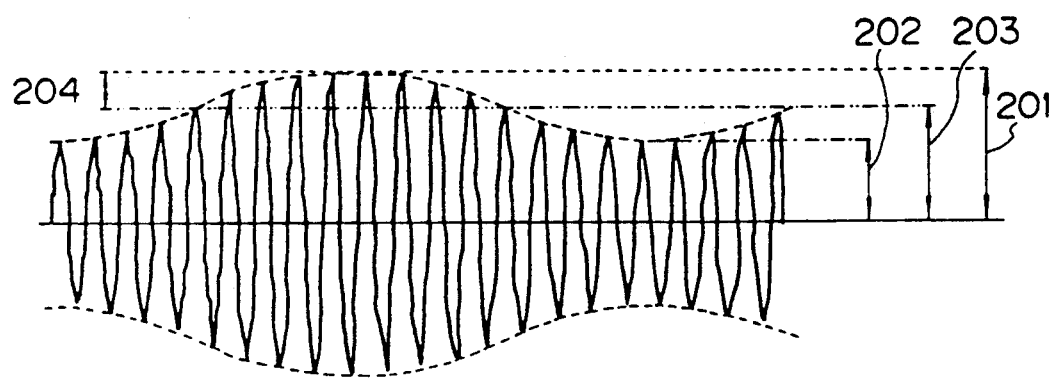
FIG. 3 shows an example of an amplitude-modulated displacement signal output from the detecting coils shown in FIG. 2.

In the displacement sensing circuit described above, a change in inductance of each detecting coil is represented in an electric signal, and the displacement signal S1 is obtained by amplitude-modulating the carrier wave supplied from the signal generator 1. For the purpose of simplifying an explanation made hereinafter, FIG. 3 shows a displacement signal having only one displacement frequency. Assume that the angular frequency and an effective amplitude of the carrier wave are designated as $\omega_c$ and $E_c$, respectively, that the angular frequency of displacement of the measured object is indicated as $\omega_m$, and that the degree of modulation is designated as m. Then the displacement signal S1 is represented as follows:

$$e = \sqrt{2E_c} \ (1 + m \cdot \cos\omega_m t)\cos\omega_c t \quad (1)$$

$$m = (E\text{max} - E\text{min})/(E\text{max} + E\text{min}) \quad (2)$$

$$m \leq 1$$

Please note that in FIG. 3 the reference numeral 201 designates the maximum value Emax of the displacement signal S1; 202 the minimum value Emin of the displacement signal S1; 203 indicates a value $\sqrt{2E_c}$; and 204 indicates a value $m\sqrt{2E_c}$. The equation (1) can be changed to the following one:

$$e = \sqrt{2E_c} \ \cos\omega_c t + m \sqrt{2E_c} \ \{\cos(\omega_c + \omega_m)t\}/2 + \quad (3)$$

$$m \sqrt{2E_c} \ \{\cos(\omega_c - \omega_m)t\}/2$$

Figure 4:
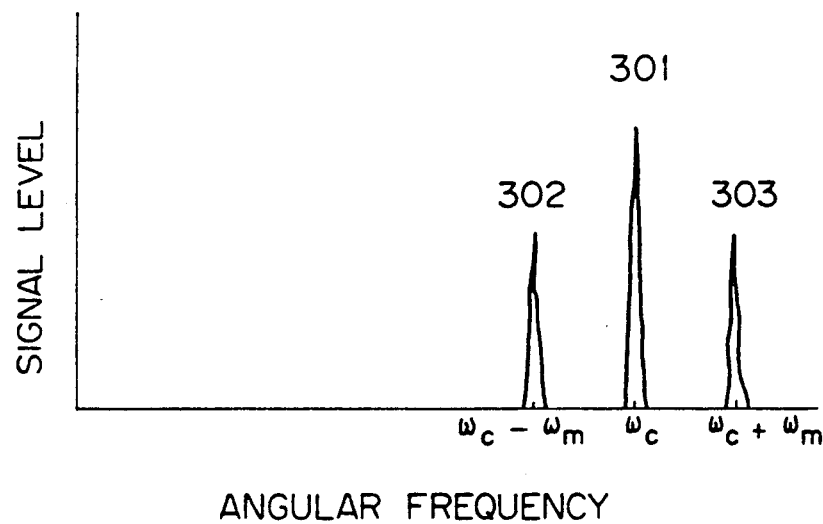
FIG. 4 shows a frequency spectrum of the displacement signal shown in FIG. 3.

In other words, the displacement signal S1 has, as shown in FIG. 4, a frequency spectrum including the angular frequency component $\omega_c$ 301 of the carrier wave and the frequency components $(\omega_c \pm \omega_m)$ 302 and 303 defined by the angular frequency of the displacement $\omega_m$.

Figure 5:
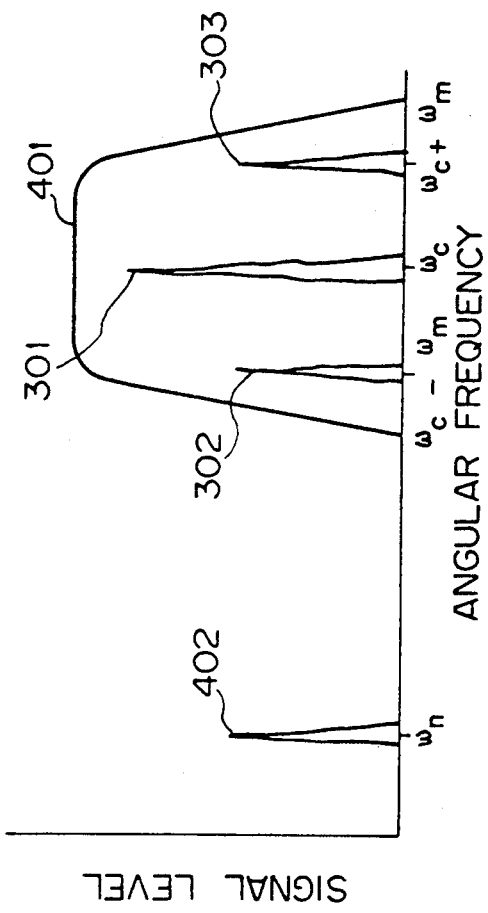
FIG. 5 shows a frequency relationship between a displacement signal and an external noise signal, and a band width of the band-pass filters shown in FIG. 2.

If a noise signal having the angular frequency $\omega_n$ as shown in FIG. 5 by reference numeral 402 is superimposed on the displacement signal, the displacement signal is then represented as follows, the symbol $E_n$ indicating the amplitude of the noise:

$$e = \sqrt{2E_c} \ \cos\omega_c t + m \sqrt{2E_c} \ \{\cos(\omega_c + \omega_m)t\}/2 + \quad (4)$$

$$m \sqrt{2E_c} \ \{\cos(\omega_c - \omega_m)t\}/2 + E_n\cos\omega_n t$$

By setting the band width of the band-pass filters 3-1 and 3-2 as shown by the reference numeral 401 in FIG. 5, it is possible to eliminate noise components having angular frequencies outside the band width of the band-pass filters. In this embodiment, if the angular frequency $\omega_m$ of the measured object is equal to the upper limit of a frequency response of the displacement sensor caused by recurring displacement of said measured object, the band width of the band-pass filters 3-1 and 3-2 is equal to at least $2\omega_m$. Such band-pass filters are thus inserted prior to the differential amplifier 4 as shown in FIG. 2 to enable a signal with attenuated noise to be obtained.

It should be noted that the band-pass filters should be inserted both in a path for the displacement signal and in a path for the reference signal. Unless the frequency of these filters coincides with that of the carrier wave, a phase change takes place. This is why the displacement and reference signals pass through the band-pass filters.

Figure 6:
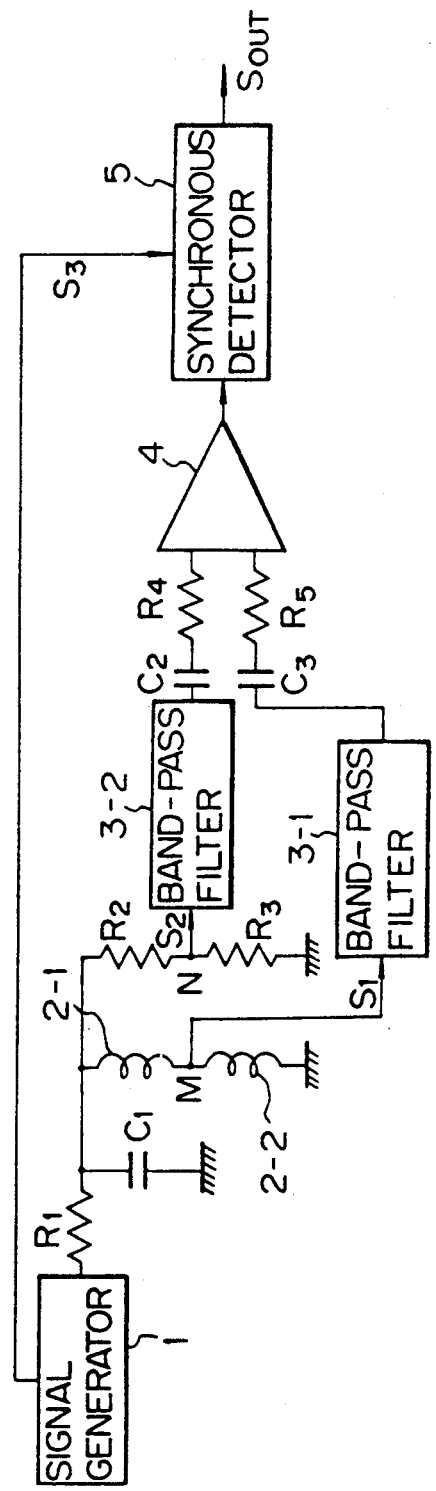
FIG. 6 shows a circuit of FIG. 2 in detail.

FIG. 6 is a block diagram showing the displacement sensing circuit shown in FIG. 2 in detail. In FIG. 6, similar or corresponding elements are designated by the same reference numerals as used in FIG. 2, and an explanation thereof is omitted here. The carrier wave supplied from the signal generator 1 is fed through a resistor R1 to one end of the series-connected detecting coils 2-1 and 2-2 and to one end of series-connected resistors R2 and R3. A positional change of the measured object causes the inductance of the detecting coils to be varied, but does not cause the resistance value of the resistors R2 and R3 to be varied. Consequently, the connecting point M between the detecting coils 2-1 and 2-2 provides a displacement signal S1, and the connecting point N between the resistors R2 and R3 provides a reference signal S2.

The displacement signal S1 passes through the band-pass filter 3-1, a capacitor C3 and a resistor R5 and is input to the first input terminal of the differential amplifier 4. The reference signal S2 passes through the band-pass filter 3-2, a capacitor C2 and a resistor R4 and is input to the second input terminal of the differential amplifier 4. The differential amplifier 4 calculates the difference between the displacement signal S1 and the reference signal S2 and amplifies the difference signal, which is in turn supplied to the synchronous detector 5. The amplified difference signal is detected synchronously with the synchronous signal S3 in the synchronous detector 5 and the output signal Sout is consequently obtained. In FIG. 6, the symbol C1 designates a capacitor.

As described above, by providing the band-pass filters 3-1 and 3-2 having the band width equal to at least twice the upper limit of the frequency response of the displacement sensor, interference signals from noise sources are fully attenuated even if the detecting coils and sensor cables are positioned adjacent to the noise sources. This ensures a more accurate measurement of the displacement of a measured object.

For example, in the case where an attenuation gradient of the band-pass filters is 20 dB/Dec, the band width of the band-pass filters is 10 kHz, the carrier frequency is 50 kHz and a noise frequency is 50 Hz, the noise is theoretically attenuated to −60 dB and as a result, does not significantly influence the measurement, because the carrier frequency is thousand times the noise frequency.

Figure 7:
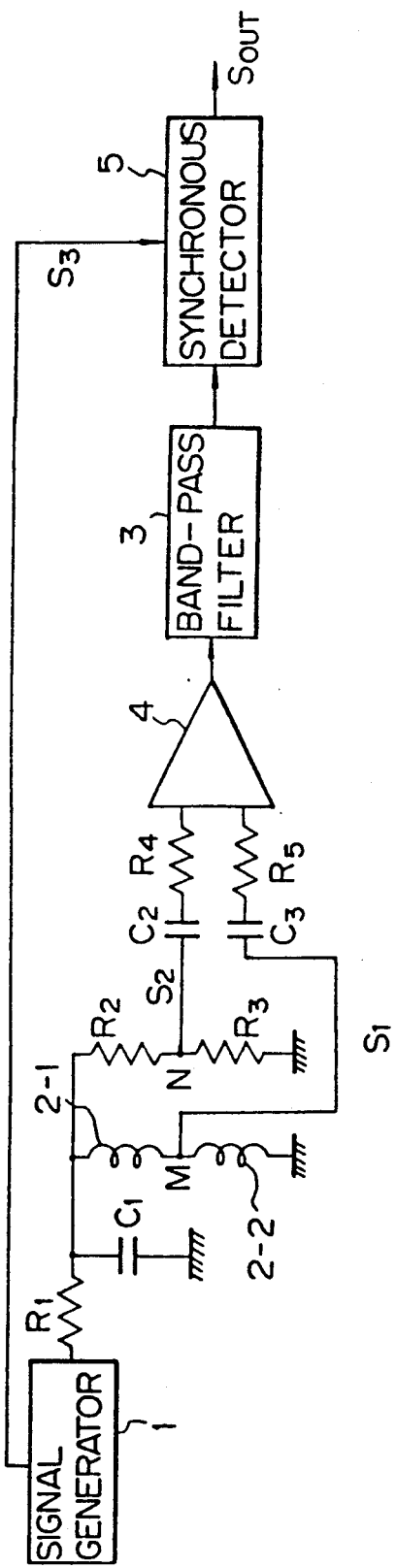
FIG. 7 shows a circuit of another embodiment of the invention.

The invention has been described in detail with reference to a certain embodiment thereof, but it is to be understood that variations and modifications are possible within the scope and spirit of the invention. For example, in the embodiment described above, the band-pass filters are inserted between the detecting coils and the differential amplifier and between the signal generator and the differential amplifier, respectively. A band-pass filter can, however, be inserted between the differential amplifier and the synchronous detector as shown in FIG. 7.

What is claimed is:

1. A displacement sensing circuit for sensing a displacement of a measured object of magnetic material without contact with the measured object, comprising:

detecting coil means disposed relative to said measured object, said detecting coil means changing inductance in response to a displacement of said measured object from a predetermined position with respect to said detecting coil means, said measured object having an upper frequency limit of recurring displacement of $\omega_m$;

signal generating means for generating and supplying a carrier wave of frequency $\omega_c$ to said detecting coil means;

band-pass filter means for receiving an output signal from said detecting coil means, said band-pass filter means having a frequency band width which is equal to at least twice the upper frequency limit $\omega_m$ of frequency of said output signal of said detecting coil means caused by recurring displacement of said measured object, said frequency band being centered at said frequency $\omega_c$; and detector means for detecting an output from said band-pass filter means and for generating a signal corresponding to said displacement of said measured object.

2. The circuit as claimed in claim 1 wherein the carrier wave is amplitude-modulated by the displacement of said measured object and an amplitude-modulated carrier signal is output from said detecting coil.

3. The circuit as claimed in claim 2 further comprising a differential amplifier, and wherein said band-pass filter means includes a first band-pass filter inserted between an intermediate point of said detecting coil means and a first input terminal of said differential amplifier, and a second band-pass filter inserted between said signal generating means and a second input terminal of said differential amplifier, the output of said differential amplifier being supplied to said detector means.

4. The circuit as claimed in claim 3 wherein said detector means is a synchronous detector receiving an output from said differential amplifier and a reference signal from said signal generating means.

5. The circuit as claimed in claim 2 further comprising a differential amplifier, and wherein said band-pass filter means includes a band-pass filter inserted between said differential amplifier and said detector means.

6. The circuit as claimed in claim 5 wherein said detector means is a synchronous detector receiving an output from said differential amplifier and a reference signal from said signal generating means.

* * * * *